United States Patent
Long et al.

(10) Patent No.: US 8,250,104 B2
(45) Date of Patent: Aug. 21, 2012

(54) LIFE CYCLE BASED DATA COORDINATION

(75) Inventors: Robert Long, Riverview, FL (US);
Chi-Hwei Julie Lin, Somerville, MA (US); Tsehsin Jason Liu, Wellesley, MA (US); Wei Miao, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/237,536

(22) Filed: Sep. 20, 2011

(65) Prior Publication Data

US 2012/0011164 A1    Jan. 12, 2012

Related U.S. Application Data

(62) Division of application No. 11/618,007, filed on Dec. 29, 2006, now Pat. No. 8,037,098.

(51) Int. Cl.
*G06F 17/00* (2006.01)
(52) U.S. Cl. ......... 707/792; 707/694; 707/795; 707/828
(58) Field of Classification Search .................. 707/694, 707/792, 795, 802, 828
See application file for complete search history.

(56) References Cited

U.S. PATENT DOCUMENTS

| | | | |
|---|---|---|---|
| 6,236,997 B1 | 5/2001 | Bodamer et al. | |
| 6,496,828 B1 | 12/2002 | Cochrane et al. | |
| 7,290,003 B1 | 10/2007 | Tong | |
| 7,299,237 B1 | 11/2007 | Clark et al. | |
| 2001/0044805 A1 | 11/2001 | Multer et al. | |
| 2003/0163801 A1* | 8/2003 | Thames et al. | 717/123 |
| 2004/0030750 A1 | 2/2004 | Moore et al. | |
| 2004/0199516 A1* | 10/2004 | Thames et al. | 707/100 |
| 2006/0179061 A1* | 8/2006 | D'Souza et al. | 707/10 |

* cited by examiner

*Primary Examiner* — Sana Al Hashemi

(57) ABSTRACT

A system may include a data store storing global data mapped from local data maintained by a plurality of heterogeneous data subsystems. The system may further include a life cycle coordinator including a global data life cycle model defining at least one life cycle for the global data, said life cycle coordinator being configured to receive a data update message defined in accordance with the global data life cycle model and representative of an update of the local data of one of the heterogeneous data subsystems, the data update message including a life cycle status identifier of a data record associated with the update, translate the data update message to at least one global data operation, the translation being based at least in part on the life cycle status identifier, and apply the update to the global data by performing the at least one global data operation.

24 Claims, 9 Drawing Sheets

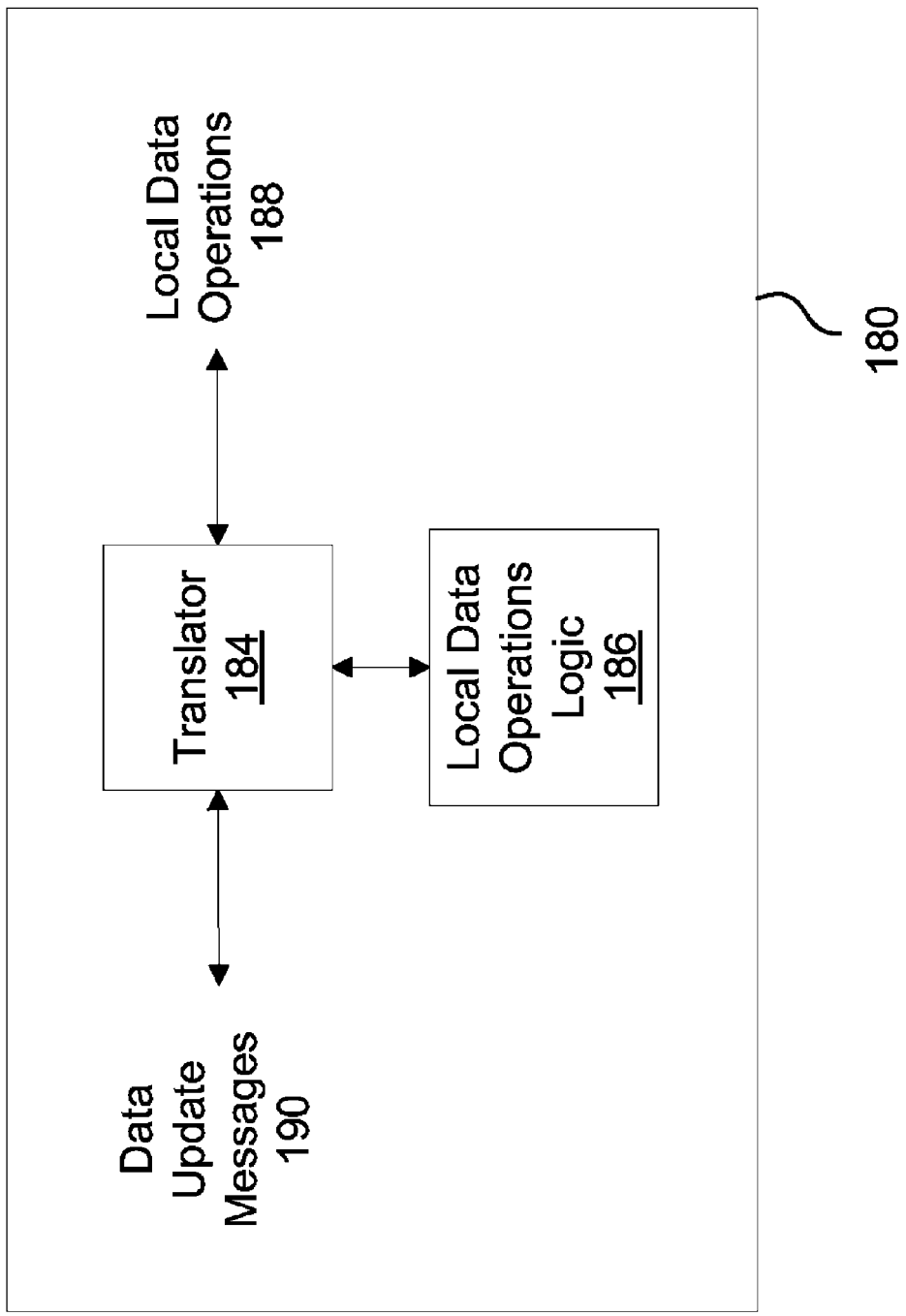

LIFE CYCLE BASED DATA COORDINATION

CROSS REFERENCE TO RELATED APPLICATIONS

This application is a divisional of U.S. patent application Ser. No. 11/618,007, filed on Dec. 29, 2006, which is hereby incorporated by reference in its entirety.

BACKGROUND INFORMATION

A typical enterprise computing environment includes multiple heterogeneous and distributed data systems supporting a variety of different enterprise organizations (e.g., departments). For example, many enterprises such as businesses and the like maintain separate database systems to support customer billing, sales, accounting, marketing, inventory, ordering, repairs, procurement, service, etc. Further, many enterprises are the result of a merger of two or more predecessors, each with their own set of heterogeneous and distributed data systems.

Data stored in the heterogeneous database systems of an enterprise is typically used for different business purposes and may be defined according to different local schemas (e.g., defined in different formats, according to different technologies, according to different data models, or according to different business rules). For example, different enterprise database systems may use different local schemas to represent a customer and/or accounts associated with the customer. In addition, because enterprise database systems often serve different business purposes, the relationships between customer and account records, and the data included in the records, may vary and/or may be defined differently across the enterprise database systems.

Maintaining multiple heterogeneous database systems can require a significant amount of work and sophistication, especially for enterprises storing large amounts of data. One area of concern involves the handling of data updates. It is particularly challenging and time consuming to propagate data updates across heterogeneous database systems in a manner that accurately and uniformly reflects customer and account evolutions while also conforming to disparate business rules and data schemas associated with the different departments in the enterprise. Conventional techniques for propagating data updates between heterogeneous data subsystems rely on ad hoc peer-to-peer relationships and communications. In certain cases, significant amounts of manual labor are required to assess peer-to-peer relationships between database systems in an ad hoc fashion. Such techniques can quickly become complicated and time consuming for an enterprise that maintains heterogeneous database systems storing large amounts of data and/or having unique and dynamic relationships with one another.

BRIEF DESCRIPTION OF THE DRAWINGS

The accompanying drawings illustrate various exemplary implementations and are a part of the specification. The illustrated implementations are merely examples and do not limit the scope of the disclosure. Throughout the drawings, identical reference numbers designate identical or similar elements.

FIG. 1B illustrates an exemplary components of a life cycle agent included in the data management system of FIG. 1A.

DETAILED DESCRIPTION

Exemplary systems and methods for coordinating data updates are described herein. In certain exemplary implementations, a data management system includes a plurality of heterogeneous data subsystems configured to maintain local data and a coordinator subsystem configured to maintain global data mapped from the local data. A global data life cycle model is used to coordinate data updates between the global data and the local data. The global data life cycle model defines at least one life cycle for the global data maintained by the coordinator subsystem. For example, the global data may include global data records, and the global data life cycle model may define one or more life cycles for the global data records. The global life cycles may give life to the global data records over time and may facilitate asynchronous data updates across the local data stored in the heterogeneous data subsystems and/or in the global data stored in the coordinator subsystem.

The heterogeneous data subsystems and the coordinator subsystem may each be configured to communicate with and translate data update messages that are defined according to the global data life cycle model. The data update messages may be translated into data operations that can be performed to update the local and/or global data. Accordingly, the coordinator subsystem can coordinate and significantly automate the propagation of data updates across data subsystems, and thereby reduce the amount of time and resources typically used for conventional ad hoc peer-to-peer data update techniques. With the global data life cycle model being used for communications between the coordinator subsystem and the heterogeneous data subsystems, the coordinator subsystem is able to provide centralized and ordered control for the propagation of data updates across the data management system.

The systems and methods described herein may be implemented by and benefit an enterprise maintaining heterogeneous data subsystems associated with various departments and/or business purposes of the enterprise. For example, a service provider enterprise may include separate data subsystems (e.g., customer billing, sales, accounting, marketing, inventory, ordering, repairs, procurement, service, etc.) and may implement a coordinator subsystem and global data life cycle model for coordinating data updates across the data subsystems. Life cycles may be used to coordinate data updates in a centrally controlled manner, and in a manner that supports the diverse business rules and operations of departments in the enterprise. In addition, life cycles may support asynchronous data updates in the global data, which may be utilized to provide a user (e.g., a customer) with access to appropriate data (e.g., customer and account data) while certain data update operations are performed transparently to the user.

Figure 1A:
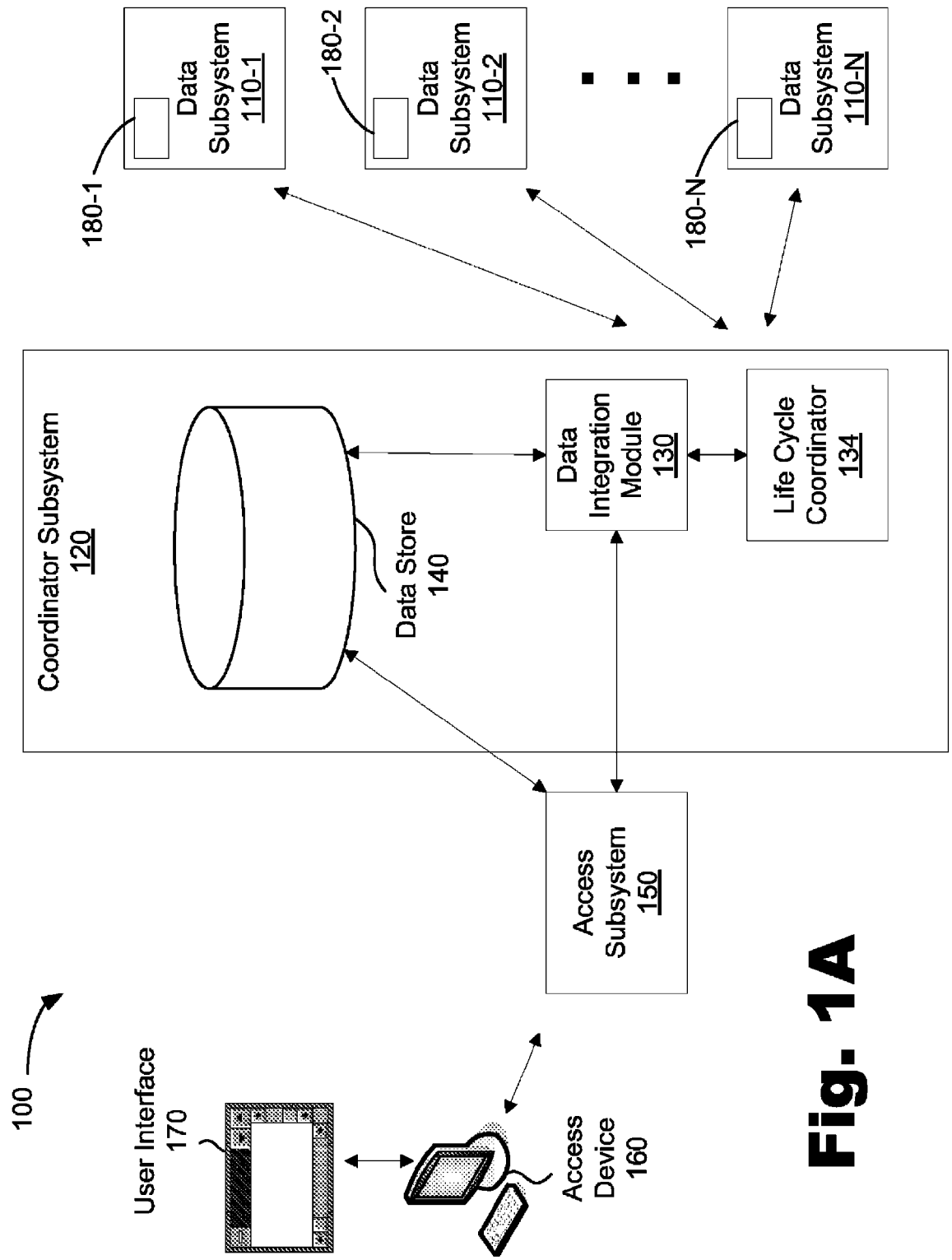
FIG. 1A is a block diagram illustrating an exemplary data management system.

FIG. 1A illustrates an exemplary data management system 100 (or simply "the system 100"), according to an implementation. As shown in FIG. 1A, the system 100 may include data subsystems 110-1 through 110-N (collectively the "data subsystems 110") communicatively coupled to a coordinator subsystem 120 having a data integration module 130, life cycle coordinator 134, and data store 140. The system 100 may also include an access subsystem 150 communicatively coupled to the coordinator subsystem 120 and also configured to communicate with an access device 160, which is configured to present a user interface 170 for consideration of a user of the access device 160.

The elements of the system 100 may communicate using any known communication technologies, devices, media, and protocols supportive of data communications, including, but not limited to, the Internet, intranets, local area networks, other communications networks, data networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, data bus technologies, and other suitable communications technologies. At least some of the communications (synchronization communications) between the data subsystems 110 and the coordinator subsystem 120 as carried out in certain exemplary implementations are described in co-pending patent application Ser. No. 11/443,364, entitled "Asynchronous Data Integrity For Enterprise Computing," filed May 31, 2006 and hereby fully incorporated herein by reference in its entirety.

In certain exemplary implementations, the elements of the system 100 are implemented in one or more computers. The system 100 may include any computer hardware and/or instructions (e.g., software programs), or combinations of software and hardware, configured to perform the processes described herein. In particular, it should be understood that the system 100 may be implemented on more than one physical computing device. Accordingly, the system 100 may include any one of a number of well-known computing devices (e.g., one or more servers), and may employ any of a number of well-known computer operating systems, including, but by no means limited to, known versions and/or varieties of the Microsoft Windows® operating system, the Unix operating system, and the OS/390 operating system. The system 100 may also employ any of a number of well-known database management tools, including, but not limited to, known versions and/or varieties of "Microsoft SQL Server" sold by Microsoft Corporation of Redmond, Wash. and "DB2" sold by International Business Machines Corporation of Armonk, N.Y.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1A, the exemplary components illustrated in the Figure are not intended to be limiting. Indeed, other alternative hardware environments and implementations may be used. The components of system 100 will now be described in additional detail.

The data subsystems 110 may include any suitable computing devices and data management applications configured to store electronic data that may be referred to as "local data." Each of the data subsystems 110 may include one or more databases and/or other data storage technologies.

In certain exemplary implementations, the data subsystems 110 maintain local data for different organizations (e.g., departments) or purposes of an enterprise. Without limitation, each of the data subsystems 110 may be associated with billing, sales, accounting, marketing, inventory, ordering, repairs, service, procurement, or other purpose or organization of the enterprise.

Typically, the different data subsystems 110 are heterogeneous. For example, one or more of the data subsystems 110 may store local data according to different data schemas (e.g., according to different technologies, formats, data models, or business rules) than the schemas used by the other data subsystems 110. For example, data subsystem 110-1 may employ a first data schema, data subsystem 110-2 may employ a second data schema, and data subsystem 110-N may employ another data schema. The data schemas may be proprietary, open, or a combination thereof.

Examples of local data that may be stored by the data subsystems 110 may include, but are not limited to, customer identifiers (e.g., customer names and codes), customer type identifiers, customer account identifiers (e.g., account numbers), customer account type identifiers, service identifiers, and service type identifiers (e.g., Plain Old Telephone Services ("POTS"), long distance services, Voice over Internet Protocol ("VoIP") services, wireless telephone services, data services, network access services (e.g., Internet access services, Digital Subscriber Line ("DSL") services, optical fiber services, content delivery services (e.g., delivery of video, audio, or multimedia content), financial services, credit card services, banking services, communication services, Asynchronous Transfer Mode ("ATM") circuits, and any other type of service that may be provided by an enterprise). Local data may also include, but is not limited to, local service status information, geographical region identifiers, addresses, dates (e.g., a date service was initiated or an account opened), service or account expiration dates, group identifiers (e.g., identifiers for a particular group of accounts or customers), and backend subsystem identifiers (e.g., identifiers indicative of the particular data subsystems 110).

The local data may be representative of relationships between information associated with customers and accounts. For example, relationships between customer entities and/or customer accounts may be represented as local data relationships (e.g., local hierarchical data structures) in the data subsystems 110. Because of the heterogeneous nature of the data subsystems 110, data relationships and other information for any particular customers and/or accounts may be the same, similar, or different across different data subsystems 110, even for the same customer. The differences may be due to disparate business purposes or operations, which often lead to the management of data according to different business rules across the different data subsystems 100. By way of an example, different business rules may dictate that a new account be added to a particular data subsystem 110 (e.g., data subsystem 110-1) used for marketing purposes in advance of the new account being added to a different data subsystem 110 (e.g., data subsystem 110-2) used for billing purposes.

The local data in data subsystems 110 may also be associated with local life cycles, which may represent life spans of local data records at a local level. The local life cycles may be defined in accordance with local life cycle models. Local life cycle models may be and typically are heterogeneous across the data subsystems 110. Accordingly, different data subsystems 110 may employ different life cycles. Each local life cycle may include one or more stages defining a life span of a data record, and a local data record may include or otherwise be associated with a particular one of the stages to indicate the life cycle status of the data record. For example, a data subsystem 110 associated with an orders department of an enterprise may define a local subscription data record representative of a customer account in accordance with a local life cycle having stages such as "create" for creation of the record, "install" for steps related to the provisioning of the service associated with the account, "test" for testing the service, "active" for an activated service, "decommission" for termination of the service, and "delete" for deletion of the subscription data record.

Each data subsystem 110 may be configured to perform local data operations to act on its local data. The local data operations may include any operation that is potentially helpful for managing the local data, including creating, accessing, modifying, and deleting local data records and relationships.

The data subsystems 110-1 through 110-N may include life cycle agents 180-1 through 180-N (collectively referred to as "life cycle agents 180"), respectively. Each of the life cycle agents 180 may be configured to coordinate local data operations and/or life cycle statuses of the corresponding data subsystem 110 with data update messages that are used to communicate with the coordinator subsystem 120 and are defined in accordance with a global data life cycle model, which is described further below. In particular, a life cycle agent 180 of a particular data subsystem 110 may be configured to (1) translate data update messages received from the coordinator subsystem 120 into local data operations that can be performed to update local data in the data subsystem 110 and (2) translate data operations performed on local data in the data subsystem 110 into data update messages that can be provided to the coordinator subsystem 120. Accordingly, a life cycle agent 180 may link local data operations of a corresponding data subsystem 110 to data update messages that can be used to interface the data subsystem 110 with the coordinator subsystem 120.

Each life cycle agent 180 may include local data operations logic that maps the global data life cycle model to local data operations and vice versa. FIG. 1B illustrates an exemplary life cycle agent 180 including a translator 184 configured to use a local data operations logic 186 for translating between local data operations 188 and data update messages 190 that are defined in accordance with a global data life cycle model. The local data operations logic 186 may be predefined by operators of the corresponding data subsystem 110 or in any other suitable manner. The local data operations logic 186 may be based on local business rules associated with the data subsystems 110 and may therefore be heterogeneous across the data subsystems 110. The local data operations logic 186 may include information representative of a local data life cycle model that is used to define local life cycles for the local data. Local data operations logic 186 may be defined to suit a particular application or data subsystem 110.

The data subsystems 110 may initiate data updates. For example, any one of the data subsystems 110 (e.g., data subsystem 110-1) may perform a local data operation 188 updating the local data included therein. The corresponding life cycle agent 180-1 may translate the local data operation 188 and generate one or more data update messages 190 including information descriptive of the local data update, the data update messages 190 being defined in accordance with a global data life cycle model. As described further below, the data update messages 190 may be provided to the coordinator subsystem 120, which can process the messages 190 and update global data to reflect the update to the local data. The coordinator subsystem 120 may also control propagation of the data update to other data subsystems 110.

In the reverse direction, the life cycle agent 180-1 of the data subsystem 110-1 may receive one or more data update messages 190 from the coordinator subsystem 120. The life cycle agent 180-1 may use its corresponding local data operations logic 186 to translate the data update messages 190 to local data operations 188 to be performed by the data subsystem 110-1. The data subsystem 110-1 may perform the local operations 188 and thereby propagate the data update in the global data through to the local data stored in the data subsystem 110-1.

The coordinator subsystem 120 may store "global data" that has been mapped from at least a subset of the local data stored in the data subsystems 110. The global data may be mapped from the local data and stored at the coordinator subsystem 120 in any suitable manner, including any of the ways described in co-pending patent application Ser. No. 11/443,363, entitled "Systems and Methods For Managing Integrated And Customizable Data," filed May 31, 2006 and hereby fully incorporated herein by reference in its entirety.

The data integration module 130 may be configured to perform any global data operations that may be potentially helpful for mapping, generating, storing, modifying, updating, accessing, deleting, or otherwise managing the global data in relation to the local data. The global data may be stored in data store 140. The data integration module 130 and data store 140 may function in any of the ways described in the above noted co-pending U.S. patent application Ser. No. 11/443,363.

The global data stored in the data store 140 may include, but is not limited to, customer records (also referred to as "subscriber records"), account records (also referred to as "subscription records"), map records indicative of relationships between customer and account records, relationship type identifiers indicative of the types of relationships between global data records, global life cycle status identifiers, and any information included in the local data from which the global data is mapped. Global data records may be assigned unique identifiers that enable the global data to be used across the system 100 and that allow the global data to be mapped from heterogeneous data subsystems 110.

The global data may represent relationships between customer entities, accounts, and/or customer entities and accounts. The data relationships in the global data may be represented by one or more hierarchical data structures (also referred to as "data hierarchies" or "data relationship views") of global data records. The hierarchical data structures may be representative of one or more local hierarchical data structures stored in the data subsystems 110. As used herein, the terms "data hierarchical structure," "data hierarchy," and "data relationship view" refer to a hierarchical relationship of data records to one another. For example, an association of an account data record to a customer data record forms a simple hierarchical data structure. Of course, other hierarchical data structures may be more complex.

Figure 2:
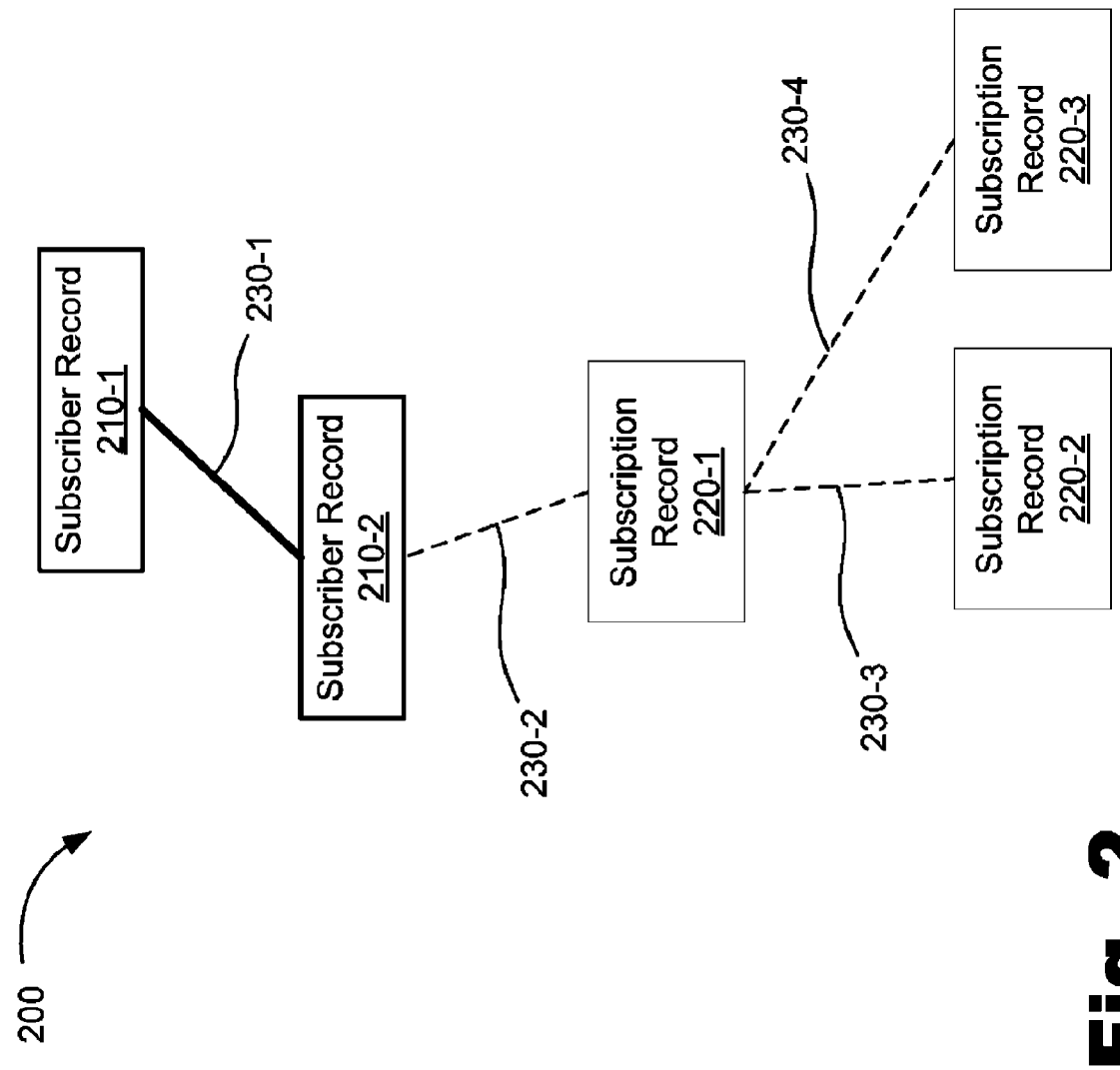
FIG. 2 illustrates an exemplary hierarchical data structure.

To facilitate an understanding of hierarchical data structures that may be included in the coordinator subsystem 120, FIG. 2 illustrates an exemplary hierarchical data structure 200. As shown in FIG. 2, hierarchical data structure 200 may include subscriber records 210-1 and 210-2, subscription records 220-1 through 220-3, and map records 230-1 through 230-4 organized to represent relationships between the data records. Hierarchical data structure 200 is just one example of many possible hierarchical data structures that may be included in the global data. One or more data objects or other suitable data instances may be used to represent the data records in the hierarchical data structure 200.

Subscriber records 210-1 and 210-2 (collectively "subscriber records 210") may represent customer entities including but not limited to business organizations and/or individuals. Map record 230-1 depicts a parent-child relationship between subscriber records 210-1 and 210-2. This may be representative of the relationship between two customer entities, such as a relationship between a subsidiary and parent company.

Subscription records 220-1 through 220-3 (collectively "subscription records 220") may represent customer accounts including, but not limited to, accounts related to services provided to an entity by an enterprise. Map records 230-3 and 230-4 depict parent-child relationships between subscription records 220-1, 220-2, and 220-3. This may be representative of the relationship between three customer accounts, such as a relationship between a summary of individual accounts. Map record 230-3 depicts an association of subscription record 220-1 to subscriber record 210-2. This may be representative of accounts associated with (e.g., paid for by) a customer.

Map records 230 may be of different types. For example, one type of map record may be used to represent relationships between subscriber records. Map record 230-1 links subscribers 210-1 and 210-2 and is an example of this type of map record. Another type of map record may be used to represent relationships between subscriber and subscription records. Map record 230-2 links subscriber 220-2 and subscription 220-1 and is an example of this type of map record. Another type of map record may be used to represent relationships between subscription records. Map records 230-3 and 230-4 link subscription records to one another and are examples of this type of map record.

As described in the above noted co-pending U.S. patent application Ser. No. 11/443,363, the global data may include multiple hierarchical data structures. In particular, separate hierarchical data structures may represent local data hierarchies in various data subsystems 110. For subscriber record 210-1, for example, the data subsystems 110 may maintain various local data hierarchies representative of local data relationships including the subscriber record 210-1, including marketing, ordering, and billing view data hierarchies, for instance. In some cases, multiple hierarchical data structures may be the same. In other cases, multiple hierarchical data structures may be different.

Figure 3:
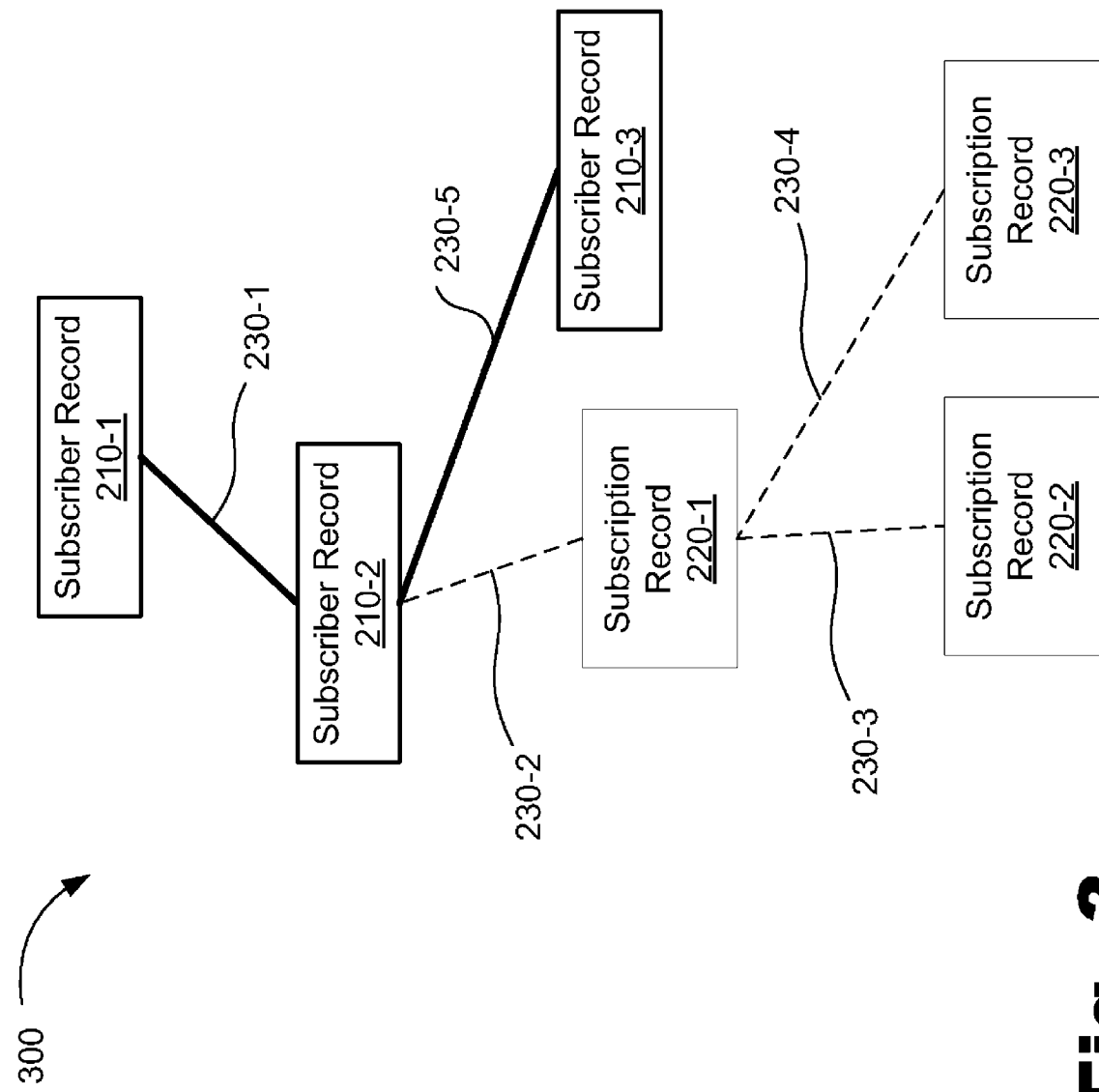
FIG. 3 illustrates another exemplary hierarchical data structure.

By way of an example, hierarchical data structure 200 may represent a global representation of a local hierarchical data structure stored in data subsystem 110-2 and having subscriber record 210-1 as the root node. The coordinator subsystem 120 may include another hierarchical data structure for the same subscriber (having the same subscriber record 210-1 as its root node) as represented in another data subsystem 110-1. For example, FIG. 3 illustrates another hierarchical data structure 300 in which subscriber record 210-1 is again the root node. Hierarchical data structure 300 is the same as hierarchical data structure 200 except that hierarchical data structure 300 includes an additional subscriber record 210-3 linked as a child node of subscriber record 210-2 by map record 230-5. Subscriber record 210-3 may be representative of a potential new customer that has been identified by a marketing department of an enterprise and is locally represented in data subsystem 110-1 but that is not yet propagated to hierarchical data structure 200, which may be associated with a billing data view.

As described further below, a global data life cycle model can be used to coordinate propagations of data updates to various hierarchical data structures in the global data. This allows data updates to be applied to different hierarchical data structures at different times (i.e., asynchronously) in view of business rules. For example, a potential new customer may be relevant to a marketing data view but not to a billing data view. When the potential new customer signs up for a service, the subscriber record for the customer may become relevant to the billing data view, and an update of the billing data view may be triggered and performed.

Global data maintained by the coordinator subsystem 120 may be defined in accordance with at least one global life cycle. The life cycle may be designed to give life to the global data over time and can be used to support asynchronous updates of hierarchical data structures in the global data. As described below, a global life cycle may specify stages of a life span of a global data record. Different data records, or types of data records, may be associated with different life cycles. Exemplary life cycles and their stages are described further below.

Figure 4:
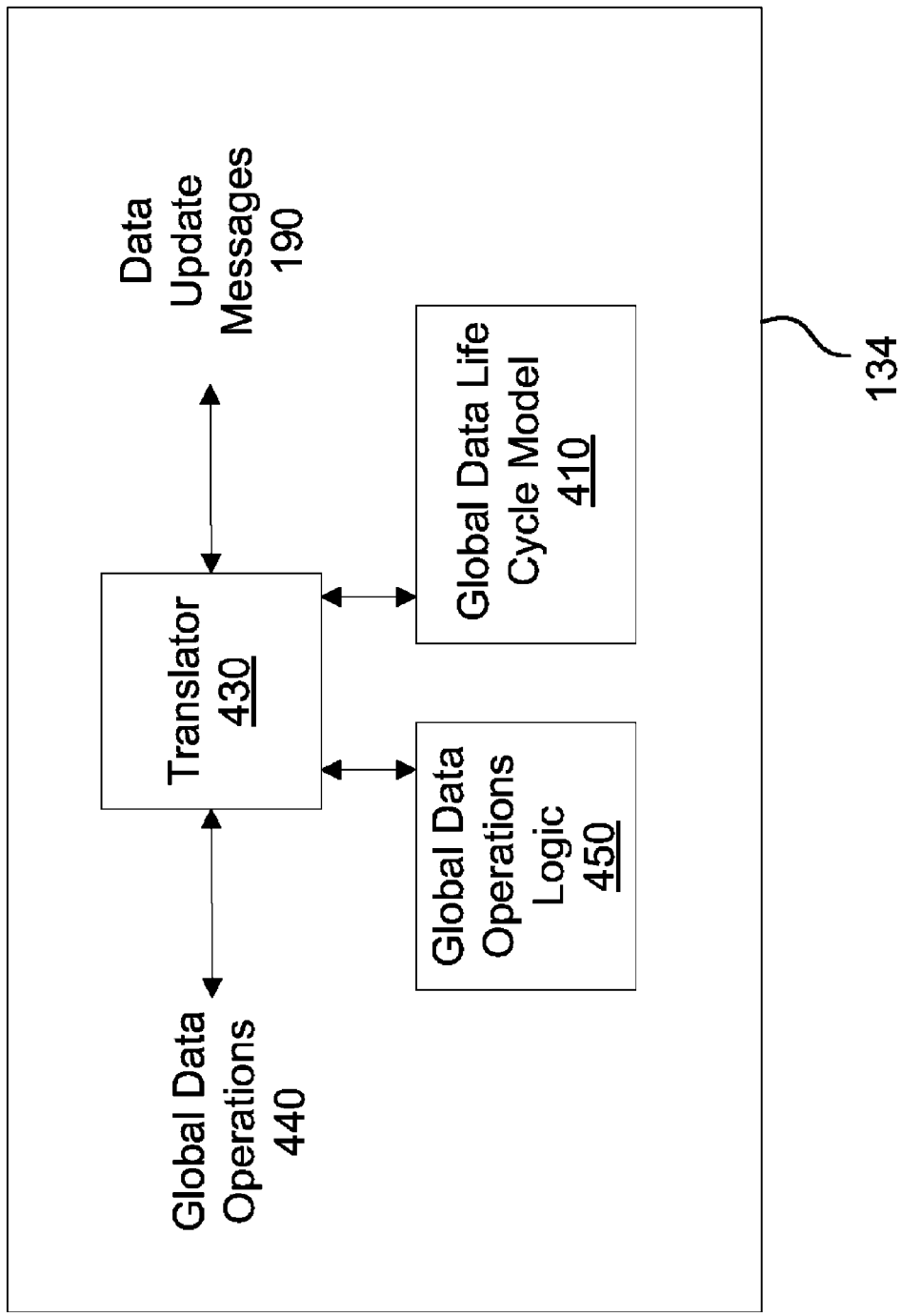
FIG. 4 illustrates exemplary components of a life cycle coordinator included in the data management system of FIG. 1A.

The coordinator subsystem 120 may include a global data life cycle model, and the global life cycles may be defined based on the global data life cycle model. The global data life cycle model may be included in the life cycle coordinator 134 of the coordinator subsystem 120. FIG. 4 illustrates an exemplary implementation of the life cycle coordinator 134. As shown, the life cycle coordinator 134 may include a global data life cycle model 410, which may be defined by operators of the coordinator subsystem 120 as may suit a particular application. The global data life cycle model 410 and life cycles defined in accordance with the global data life cycle model 410 may be representative of business rules. Accordingly, data record life spans as defined by the life cycles can be representative of typical data life spans that may occur or be employed for a particular business application. In certain examples, a life span is associated with the statuses of a data record in relation to its creation, modification, deletion, or other events. Thus, the life cycles can give life to global data records over time and in association with the stages of the items (e.g., customer entities, accounts, and data relationships) represented by the data records.

The global data life cycle model may selectively correlate specific life cycles with certain global data records. The correlation may be based on the type of a global data record. In certain implementations, for example, subscriber records 210 are associated with a first global life cycle (e.g., a subscriber life cycle), subscription records 220 are associated with a second life cycle (e.g., a subscription life cycle), and map records 230 are associated with one or more other life cycles (e.g., map life cycles). In certain implementations, subscriber records 210 may adhere to a subscriber life cycle representative of a typical life span of customer records, subscription records 220 may adhere to a subscription life cycle representative of a typical life span of customer account records, and map records 230 may adhere to one or more map record life cycles representative of typical life spans of data relationships.

Different types of map records 230 may be associated with different life cycles. For example, a subscriber-subscriber map record 230-1 may adhere to a first map record life cycle, a subscription-subscription map record 230-3 may adhere to a second map record life cycle, and a subscriber-subscription map record 230-3 may adhere to a third map record life cycle. This may be helpful for representing differences between life spans of different types of data relationships.

The stages of life cycles may be referred to as life cycle statuses and may be indicated by life cycle status identifiers. A global data record may include or otherwise be associated with a life cycle status identifier indicative of the current life cycle status of the data record. The life cycle status identifier of a data record may be updated to reflect a change in the life cycle status of the data record.

Data update messages 190 may also include life cycle status identifiers associated with data updates and/or the data records associated with data updates. Accordingly, the life cycle status identifiers in data update messages 190 can be used to coordinate data updates across the data subsystems 110 and within the coordinator subsystem 120, as described further below.

An exemplary global data life cycle model 410 and associated life cycles and life cycle status identifiers will now be described. However, the description of the exemplary global data life cycle model 410 and associated life cycles and life cycle status identifiers is not limiting. Any other suitable global data life cycle model 410 may be employed as may suit a particular application.

In certain exemplary implementations, a subscription record life cycle may include stages referred to as "pending," "active," "disconnected," "final," "inactive," and "deleted." A life cycle status identifier in a subscription record 220 may indicate the current life cycle stage for the subscriber record 220. For example, a subscription record 220 may be created to represent a new account. At this stage, the life cycle status identifier for the subscription record 220 may be and remain "pending" until a predetermined event occurs. For instance, the life cycle status identifier may be changed to "active" when a service associated with the new account has been made available. The subscription record 220 may be "disconnected" for a number of reasons, including termination of service by the customer or the enterprise. The life cycle status for the subscription record 220 may be updated to "final" to prevent certain actions from being performed in relation to the subscription record 220. The subscription record 220 may be "deleted" to end its life cycle.

In certain exemplary implementations, a subscriber record life cycle may include stages referred to as "pending," "active," "verified," "unverified," "expired," "inactive," "no action," and "deleted." A life cycle status identifier in a subscriber record 210 may indicate the current life cycle stage for the subscriber record 210. For example, a subscriber record 210 may be created to represent a potential new customer. At this stage, the life cycle status identifier for the subscriber record 210 may be "pending." When the potential new customer becomes a customer by establishing or agreeing to establish an account for a service, the subscriber record 210 may be updated to have an "active" life cycle status. At the end of a first billing cycle for the service subscribed to by the customer, the subscriber record 210 may be updated to have a "verified" life cycle status. The subscriber record 210 may be "unverified" and/or "expired" for a number of reasons, including dissolution or divestiture of the customer entity. The subscriber record 220 may also be "unverified" to allow it to be updated in accordance with a data update (e.g., a transfer to a different parent node). The life cycle status for the subscriber record 210 may be updated to "no action" to prevent certain actions from being performed in relation to the subscriber record 210, including assigning a subscription record 220 to the "no action" subscriber record 210. The subscriber record 210 may be "deleted" to end its life cycle.

In certain exemplary implementations, a map record (e.g., map record 230-3) linking subscription records 220 together may be associated with a life cycle having "establish," "remove," and "transfer" stages. The map record 220-3 may include a life cycle status identifier indicating the current life cycle stage of the map record 220-3. An "establish" status may indicate the existence of a parent-child relationship, or may serve to instruct that a parent-child relationship be established between subscription records 220. A "remove" status may indicate the termination of a parent-child relationship, or may instruct that a parent-child relationship be terminated between subscription records 220. A "transfer" status may instruct that a child subscription record 220 be moved to a different parent node.

In certain exemplary implementations, a map record (e.g., map record 230-1) linking subscriber records 210 together may be associated with a life cycle having "establish," "verify," "unverify," "remove," and "transfer" stages. The map record 230-1 may include a life cycle status identifier indicating the current life cycle stage of the map record 230-1. The "establish," "remove," and "transfer" statuses may be the same or similar to those described above for a subscription-to-subscription map record 230-1. A "verify" status may be used to lock the relationship and can be used to prevent changes to map record 230-1. An "unverify" status may be used to unlock the relationship and can be used to allow changes (e.g., changes for data updates) to be made to the map record 230-1.

In certain exemplary implementations, a map record (e.g., map record 230-2) linking a subscriber record 210-2 with a subscription record 220-1 may be associated with a life cycle having "assign," "verify," "unverify," "unassign," "transfer," and "copy" stages. The map record 230-2 may include a life cycle status identifier indicating the current life cycle stage of the map record 220-1. The "establish," "remove," and "transfer" statuses may be the same or similar to those described above for a subscription-to-subscription map record 230-3. A "verify" status may be used to lock the relationship and can be used to prevent changes to the map record 220-1. An "unverify" status may be used to unlock the relationship and can be used to allow changes (e.g., changes for data updates) to be made to the map record 220-1. An "unassign" status may be used to put a map record in a temporary state of not being assigned to a parent and/or child node. This may be in preparation for a data operation, such as a change to a data relationship. A "copy" status may be used to instruct that a copy of a map record be made.

The global data life cycle model, life cycles, and life cycle status identifiers, including the exemplary global data life cycle model, life cycles, and life cycle status identifiers described above, may be used to coordinate data updates in the global data and between the global data and the local data. Updates may be represented in one or more data update messages 190 defined in accordance with the global data life cycle model 410. The data update messages 190 may include life cycle status information descriptive of or otherwise associated with the data updates. The life cycle status information, which is defined in accordance with the global data life cycle model 410, can be used by the coordinator subsystem 120 and/or the data subsystems 110 to identify data operations to be performed for the data update. Accordingly, the data update messages 190 provide a common data update communication protocol that enables the coordinator subsystem 120 to coordinate data updates across local data in the data subsystems 110 and/or within the global data stored in data store 140.

When a data update is initiated and/or performed in one set of data, data update messages 190 defined in accordance with the global data life cycle model 140 can be used to communicate data representative of the data update across elements of the system 100, which are able to process the data update messages 190, including translating them into location-specific data operations to be performed to carry out the data update. The coordinator subsystem 120 and the data subsystems 110 can use life cycle status information included in data update messages 190 to identify the appropriate data operations to be performed.

As shown in FIG. 4, the life cycle coordinator 134 may include a translator 430 configured to translate between data update messages 190 and global data operations 440. Translations may be performed using global data operations logic 450. The global data operations logic 450 may be predefined by an operator of the coordinator subsystem 120 and may be tailored to suit a particular application. The global data operations logic 450 may map global data operations 440 to data update messages 190 and vice versa. The global data operations logic 450 may be representative of business rules of an enterprise.

The global data operations 440 may include any operations that may be performed on the global data stored in data store 140, including creating, storing, accessing, modifying, updating, transferring, rearranging, deleting, or otherwise managing the global data. The global data operations 440 may be executed by the data integration module 130.

To facilitate an understanding of the capabilities of the system 100, an exemplary coordination of certain data updates will now be described. The following examples are not limiting in any sense. The system 100 may also coordinate other data updates.

In one particular example, a customer entity may merge with another customer entity, and data maintained by the system 100 may be updated in a coordinated manner to reflect the merger. As used herein, the term "merger" may refer to any change in relationships between business entities, including acquisitions, divestitures, etc. The life cycle coordinator 134 can control the propagation of data updates such that different sets of data are updated at appropriate times as may be defined by business rules.

Figure 5:
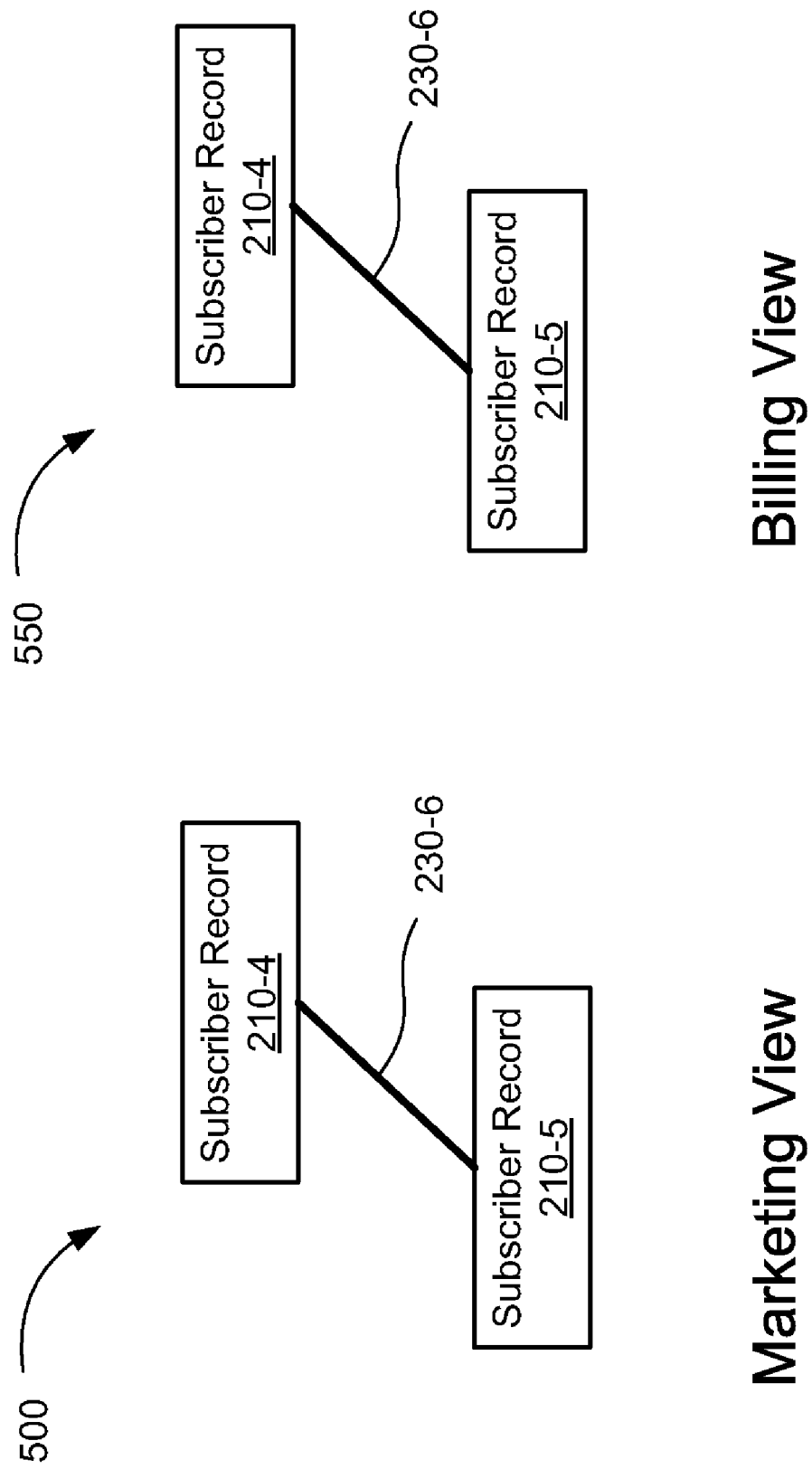
FIG. 5 illustrates exemplary hierarchical data structures in a first state.

FIG. 5 illustrates hierarchical data structures 500 and 550 that may be included in the global data stored in the data store 140 prior to a merger being integrated into the system 100. In this particular example, hierarchical data structures 500 and 550 are the same and include subscriber record 210-4 situated as a parent node of subscriber record 210-5. Map record 230-6 links the subscriber records 210-4 and 210-5. In this example, each of the data records in hierarchical data structures 500 and 550 has an "active" life cycle status. Hierarchical data structure 500 may represent a marketing data view representative of local data relationships in data subsystem 110-1, and hierarchical data structure 550 may represent a billing data view representative of local data relationships in data subsystem 110-2.

The hierarchical data structures 500 and 550 may represent a relationship between business entities. For example, subscriber record 210-4 may represent a parent company and subscriber record 210-5 may represent a subsidiary of the parent company.

A marketing department may learn of a merger in which the parent entity represented by subscriber record 210-4 has sold its subsidiary entity represented by subscriber record 210-5 to another business entity. The marketing department may learn of the merger in any suitable way, including by way of a third-party notification service. The marketing department may initiate a data update that updates local data in data subsystem 110-1 to reflect the merger. For example, a local data record for the subsidiary entity may be moved from being a child node of the origin parent entity to become a child node of a data record representative of the new parent entity. The update may be performed using local data operations and in accordance with local marketing business rules associated with the data subsystem 110-1.

The local data update may be propagated from data subsystem 110-1 to other elements of the system 100 in a coordinated manner that is configured to adhere to diverse business rules associated with the elements of the system 100. In data subsystem 110-1, translator 184 may translate the local data operations that were performed to carry out the update into one or more data update messages 190. The translation may be performed based on predefined local data operations logic 186, as described above. Data update messages 190 may be sent from the data subsystem 110-1 to the coordinator subsystem 120.

The data update messages 190 may be defined in accordance with the global data life cycle model 410 and may include at least one life cycle status identifier associated with the data update. For example, the data update messages 190 may identify subscriber records 210-4 and 210-5 and map record 230-6, as well as their life cycle statuses before, during, and after the data update. For example, subscriber record 210-5 may be "unverified" and "verified" during the data update. Map record 230-6 may be "unverified," "transfer," and "verified" during the data update.

The data update messages 190 may include any other information that may be helpful for performing the data update, including data identifying a global subscriber record 210-6 that is representative of the new parent entity and destination information identifying the subscriber record 210-6 as the new parent node of subscriber record 210-5.

The data update messages 190 may include any information descriptive of the merger. For example, the data update messages 190 may include a date on which the merger was agreed to, announced, or approved, as well as a data on which the merger is projected to be granted legal effect. For example, the merger may be announced on a particular date and be projected to become legally effective at a later data (e.g., three months later).

The coordinator subsystem 120 may receive the data update messages 190 and translate them into global data operations 440 to be performed to carry out the data update in the global data. The translator 430 of the life cycle coordinator 134 may perform the translation based on predefined global data operations logic 450, as described above. The translation may also consider any information included in the data update messages 190, including life cycle identifiers, dates, source, etc. This information may be used to coordinate asynchronous updates of hierarchical data structures included in the global data. For example, the global data operations logic 440 may be defined to indicate that the marketing view hierarchical data structure 500 is to be updated when the data subsystem 110-1 is updated. The data update messages 190 may identify data subsystem 110-1 as their source, and translator 430 may generate global data operations for updating hierarchical data structure 500 to reflect the local data update performed in data subsystem 110-1. The data integration module 130 may apply the global data operations to the hierarchical data structure 500 to form hierarchical data structure 600, which is shown in FIG. 6.

Figure 6:
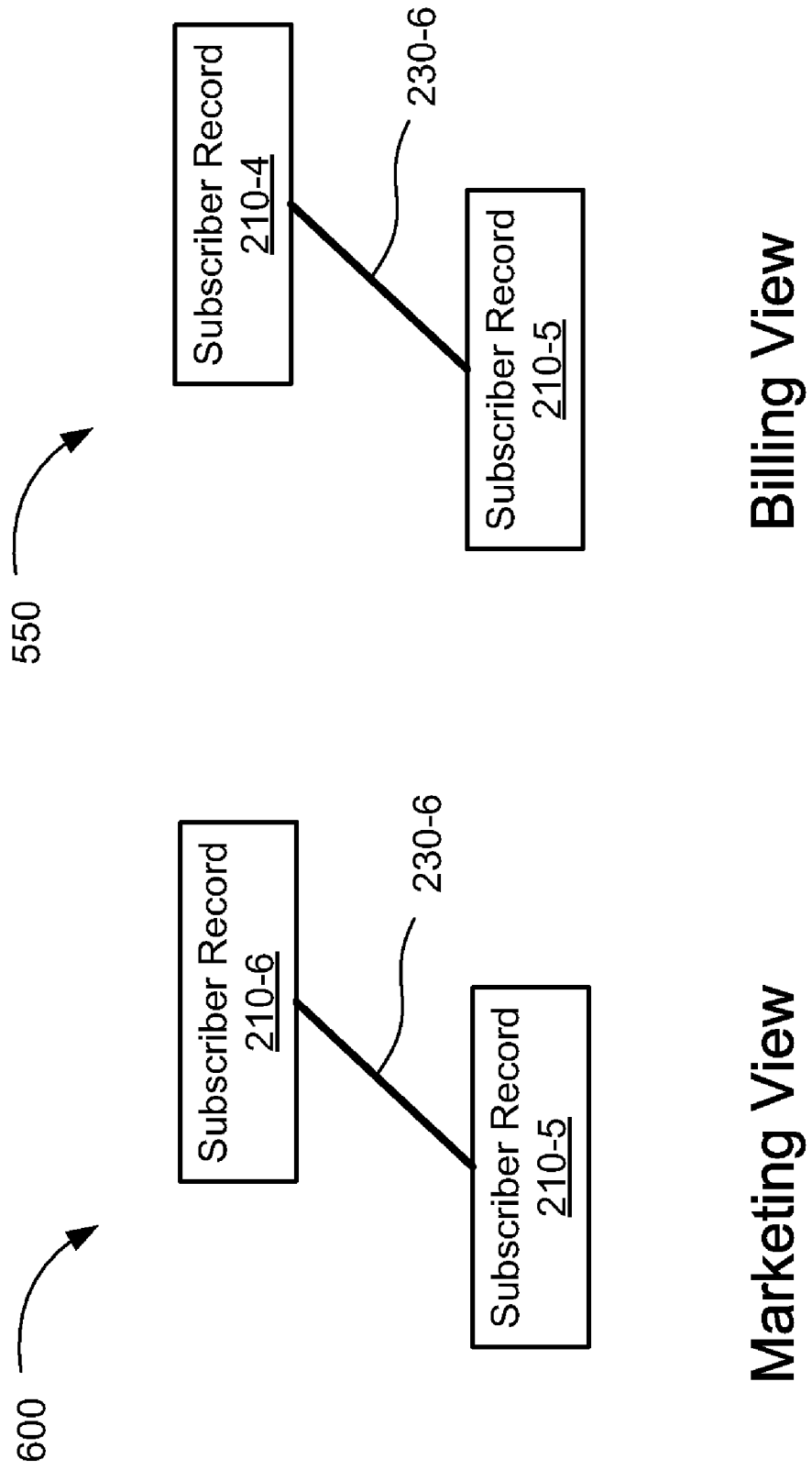
FIG. 6 illustrates exemplary hierarchical data structures in a second state.

FIG. 6 illustrates the state of the global data after the data update has been propagated to the global marketing view representative of local data in data subsystem 110-1 but before the data update has been propagated to the global billing view (i.e., hierarchical data structure 550) representative of the local data in data subsystem 110-2. This is one example of an asynchronous update of hierarchical data structures included in the global data of the coordinator subsystem 120. As described below, such asynchronous updates of data relationship views in the global data can be used to provide a user of the access device 160 with access to certain global data to which the user is entitled. The access may be provided while data updates are being performed.

The life cycle coordinator 134 may be configured to determine when to propagate the data update to the billing hierarchical data structure 550. The determination may be made in any suitable manner. In some examples, the life cycle coordinator may schedule the propagation to be performed when the merger is given legal effect (e.g., at the three month date specified in the data update messages 190 or when an external source notifies the coordinator subsystem 120 that the merger has been granted legal effect).

Figure 7:
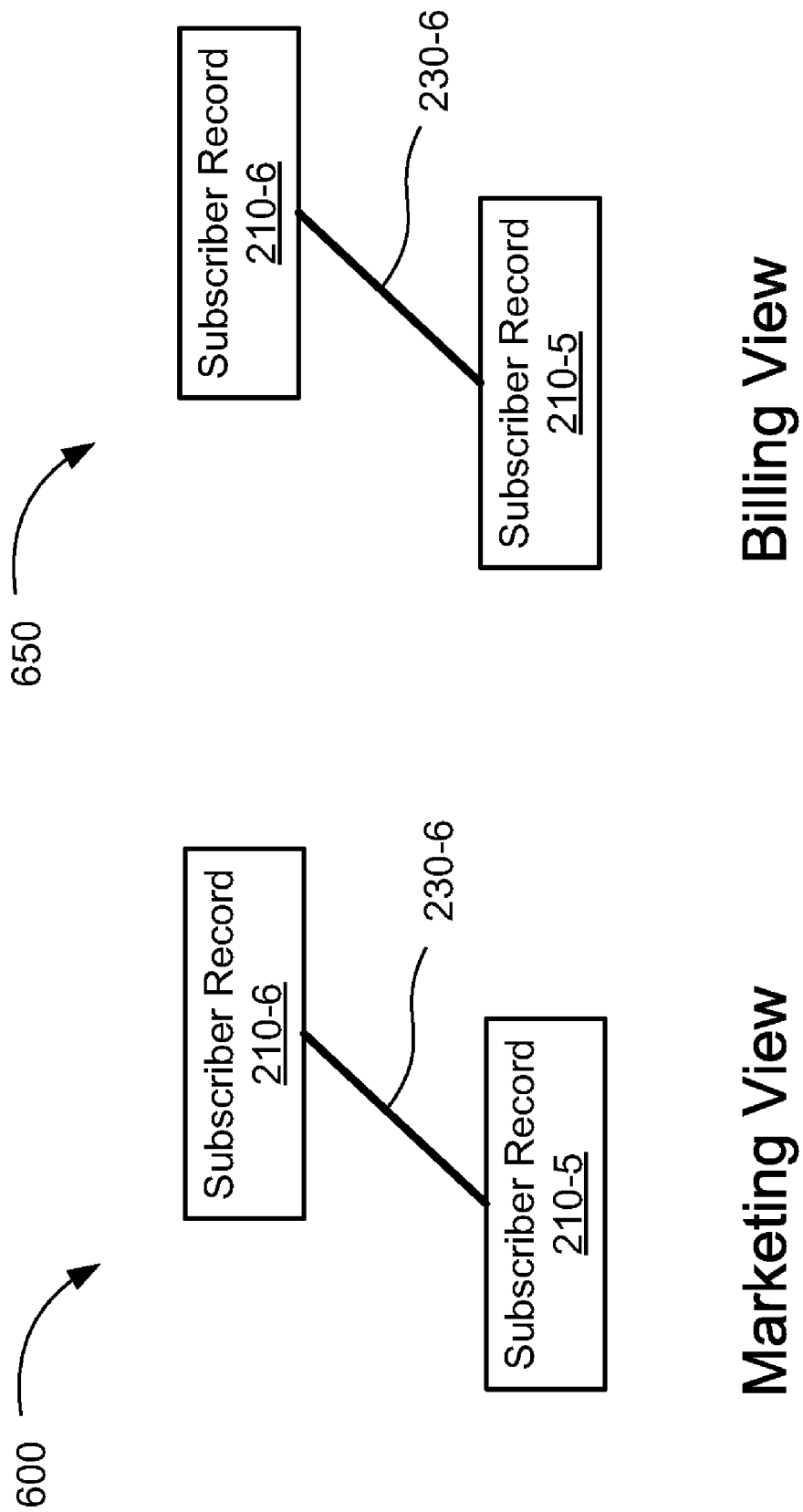
FIG. 7 illustrates exemplary hierarchical data structures in a third state.

At this point, the life cycle coordinator 134 and data integration module 120 may function as described above to apply global data operations to the billing view hierarchical data structure 550 to form hierarchical data structure 650 shown in FIG. 7. FIG. 7 illustrates the state of the global data after the data update has been propagated to both the global marketing view representative of local data in data subsystem 110-1 and the global billing view representative of the local data in data subsystem 110-2. As shown in FIG. 7, subscriber record 210-5 has been transferred from subscriber record 210-4 to subscriber record 210-6. This may be accomplished by unverifying, reassigning, and verifying map record 230-6 such that it is reassigned to identify subscriber record 210-6 as its parent node.

The life cycle coordinator 134 may be configured to propagate the update to the global billing view to the corresponding data subsystem 110-2. The life cycle coordinator 134 may translate the global data operations performed on the billing view into one or more data update messages 190 that are representative of the update and defined in accordance with the global data life cycle model 410. The data update messages 190 may include any information associated with the data update, including life cycle statuses associated with the update.

The data update messages 190 may be provided to the data subsystem 110-2 in any suitable manner. In certain implementations, the coordinator subsystem 120 may be configured to broadcast data update messages 190 to all of the data subsystems 110, which may be configured to determine whether the data update messages 190 are locally relevant. To this end, the data update messages 190 may include data identifying the data subsystem 110-2, the nature of the update made in the global data, or any other information that might be helpful for determining the local relevancy of the data update messages 190. In other implementations, the coordinator subsystem 120 may be configured to determine the relevant data subsystems 110 and provide the data update messages 190 only to the identified data subsystems 110.

In this or similar manner, the coordinator subsystem 120 can coordinate data updates across different sets of data stored in the system 100. The global data life cycle model provides a common protocol for defining and communicating data update messages 190 between the elements of the system 100. Further, the global data life cycle model enables data updates to be performed asynchronously across the system 100 to the satisfaction of diverse business rules.

The coordinator subsystem 120 may similarly control propagations of other data updates across the system 100, including data updates initiated by a user of the access device 160 by way of the access subsystem 150. For example, a user may order a service through the access subsystem 150, and the coordinator subsystem 120 may coordinate updates associated with creating and managing data representative of the service.

Returning now to FIG. 1A, the access subsystem 150 may include or be implemented on one or more computing devices (e.g., servers). In certain implementations, the access subsystem 150 includes one or more servers configured to communicate with the access device 160 over a communication network. The communication network may include any network suitable for carrying communications between the access device 160 and the access subsystem 150, including, but not limited to, the Internet or an intranet. In certain implementations, the access subsystem 150 includes one or more web servers configured to provide web-based communications (e.g., Hypertext Markup Language ("HTML") messages) to the access device 160. In certain implementations, the access subsystem 150 provides an access portal by users (e.g., customers subscribing to enterprise services) can access and manage information associated with the user and maintained by the enterprise.

The access subsystem 150 may be configured to receive input messages from the access device 160, which may include any messages for interacting with the coordinator subsystem 120. Through the access subsystem 150, a user may order services, initiate data updates, access views of global data to which the user is entitled access, and perform any other function that utilizes or affect the global data associated with the user. Through the access subsystem 150, a user of the access device 160 may perform any of the remote access functions described in the above noted co-pending U.S. patent application Ser. No. 11/443,363.

The access device 160 may include any device physically or remotely accessible to one or more users (e.g., users associated with an enterprise or with a customer of an enterprise) and that allows a user to provide input to and receive output from the access subsystem 150. For example, the access device 160 can include, but is not limited to, one or more desktop computers, laptop computers, tablet computers, personal computers, personal data assistants, cellular telephones, satellite pagers, wireless internet devices, embedded computers, video phones, network interface cards, mainframe computers, mini-computers, programmable logic devices, routers, modems, home communication terminals, set-top boxes, and any other devices capable of communicating with the access subsystem 150. The access device 160 can also include various peripherals such as a terminal, keyboard, mouse, screen, printer, stylus, input device, output device, or any other apparatus that can help a user interact with the access device 160.

The access device 160 may be communicatively coupled to the access subsystem 150 using any suitable communication technologies, including any of the communication technologies listed above.

The access device 160 provides access to the access subsystem 150 and consequently to the data integration subsystem 120 via the access subsystem 150. The access device 160 and access subsystem 150 may be configured to provide internal access (e.g., to enterprise users), external access (e.g., to customer users), or both internal and external access to the data integration subsystem 120 and the integrated data stored therein.

The access device 160 may include instructions for generating and operating the user interface 170. The instructions may be in any computer-readable format, including software, firmware, microcode, and the like. When executed by a processor (not shown) of the access device 160, the instructions may present the user interface 170 to a user of the access device 160.

The user may utilize the user interface 170 to initiate communications (e.g., data updates) with and/or consider output from the access subsystem 150. The user interface 170 may be equipped to present information to and receive input from users. For example, the user interface may present views of global data to a user of the access device 160.

In certain implementations, the coordinator subsystem 120 may be configured to provide access to one or more particular views of global data relationships (e.g., hierarchical data structures) via the access subsystem 150. Accordingly, a user can access and view certain hierarchical data structures. A particular hierarchical data structure to which a user has access may be referred to as an entitlement view. In certain exemplary implementations, the entitlement view is the same as the billing view in the global data.

Because a user may have access to an entitlement view of data, the coordinator subsystem 120 may provide additional controls or checks for data updates to the entitlement view. In certain examples, data updates may be propagated to the entitlement view only when the updates are verified as something that should be made available to the user. For example, a billing data subsystem 110-1 may be asked to verify a data update before it is applied to an entitlement view. This enables the system 100 to perform certain data update operations in a manner that is transparent to the user. For example, relationships between data records may be changed for certain hierarchical data structures without the user being aware of it. The user may continue to have access to the entitled data during the data update process. When the data update is complete and verified, it may then be applied to the entitlement view for access by the user. This is another benefit of asynchronous updates of global data views.

While FIG. 1 shows a single access device 160 and user interface 170, this is only illustrative. One or more access devices 160 and user interfaces 170 may be used for communications with the access subsystem 150.

Figure 8:
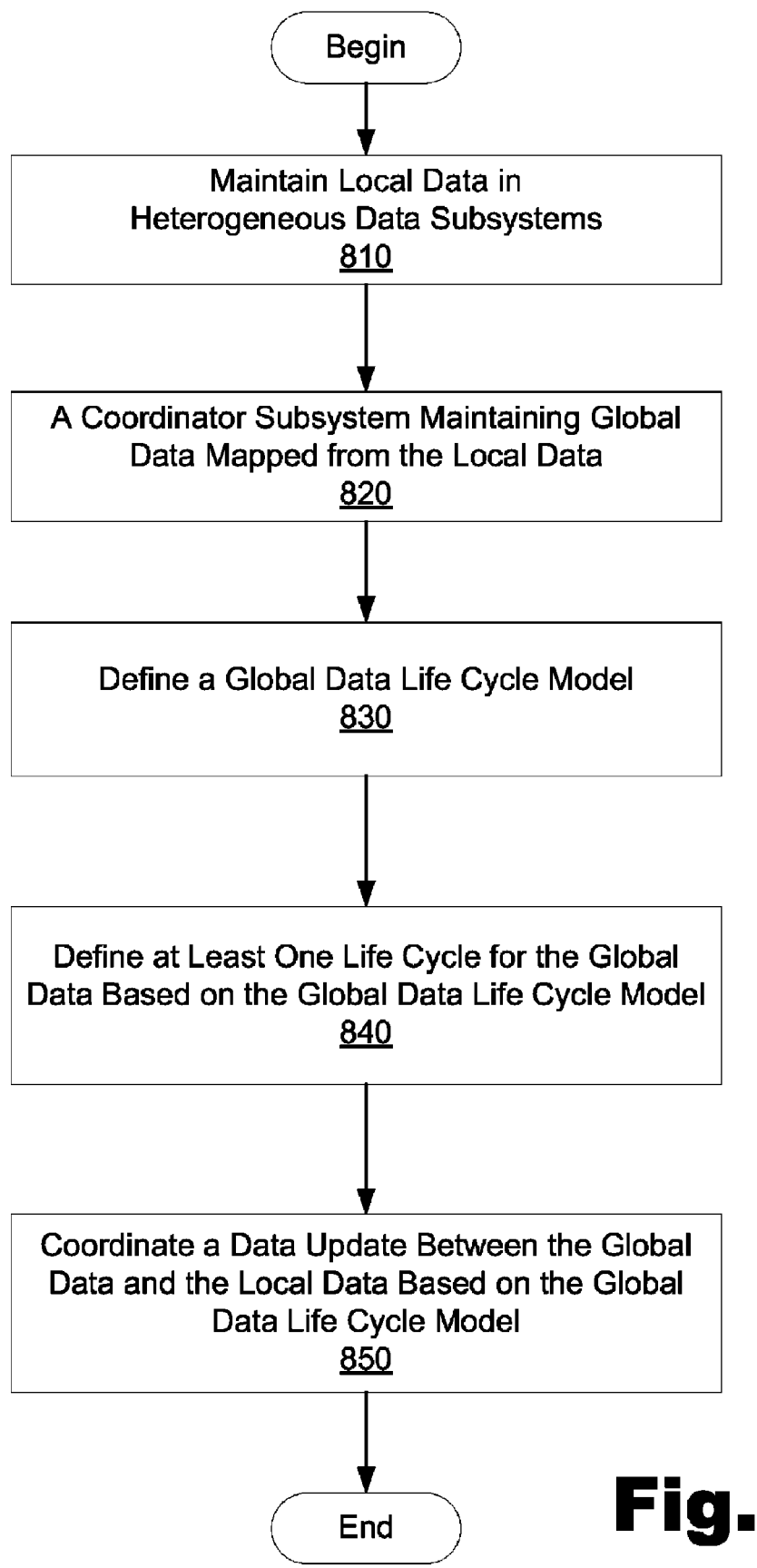
FIG. 8 is a flowchart illustrating an exemplary data update process.

FIG. 8 is a flowchart illustrating an exemplary data update process. While FIG. 8 illustrates exemplary steps according to one implementation, other implementations may omit, add to, reorder, and/or modify any of the steps shown in FIG. 7.

In step 810, local data is maintained in a plurality of heterogeneous data subsystems 110. Step 810 may be performed in any of the ways described above. The local data may be maintained according to local business rules, which may be diverse across the data subsystems 110.

In step 820, a coordinator subsystem 120 maintains global data mapped from the local data. Step 820 may be performed in any of the ways described above, including any of the ways described in the above noted U.S. patent application Ser. No. 11/443,363.

In step 830, a global data life cycle model is defined. Step 830 may be performed in any of the ways described above, including one or more operators of the coordinator subsystem 120 defining the global data life cycle model to represent business rules of enterprise organizations. As described above, the global data life cycle model may provide a common protocol for communications between the coordinator subsystem and the heterogeneous data subsystems.

In step 840, at least one life cycle is defined for the global data based on the global data life cycle model. Step 840 may be performed in any of the ways described above. In certain implementations, different life cycles are defined for different types of data records included in the global data.

In step 850, a data update is coordinated between the global data and the local data based on the global data life cycle model. Step 850 may be performed in any of the ways described above, including using one or more data update messages defined in accordance with the global data life cycle model for communications between the coordinator subsystem 120 and the heterogeneous data subsystems 110. Each data update message may include at least one life cycle identifier for a data record associated with the data update. The life cycle identifier may be used to determine data operations to be performed to apply the data update. Significantly, the life cycle identifier may also be used to determine when to apply data updates to specific data instances such that data updates can be applied asynchronously as may best fit business rules of the heterogeneous data subsystems.

The preceding description has been presented only to illustrate and describe exemplary implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A system comprising:
a data store storing global data mapped from local data maintained by a plurality of heterogeneous data subsystems; and
a life cycle coordinator including a global data life cycle model defining at least one life cycle for the global data, the life cycle coordinator being configured to
receive a data update message defined in accordance with the global data life cycle model and representative of an update of the local data of one of the heterogeneous data subsystems, the data update message including a life cycle status identifier of a data record associated with the update,
translate the data update message to at least one global data operation, the translation being based at least in part on the life cycle status identifier, and
apply the update to the global data by performing the at least one global data operation.

2. A method comprising:
maintaining, by a coordinator subsystem, global data mapped from local data maintained by a plurality of heterogeneous data subsystems;

including, in a life cycle coordinator of the coordinator subsystem, a global life cycle model defining at least one life cycle for the global data;

receiving a data update message defined in accordance with the global data life cycle model and representative of an update of the local data of one of the heterogeneous data subsystems, the data update message including a life cycle status identifier of a data record associated with the update;

translating the data update message to at least one global data operation, the translation being based at least in part on the life cycle status identifier; and applying the update to the global data by performing the at least one global data operation.

3. A method comprising:

receiving, by a coordinator subsystem, a data update message defined in accordance with the global data life cycle model and representative of an update of the local data of one of the heterogeneous data subsystems, the data update message including a life cycle status identifier representative of a life cycle stage for a data record associated with the update of the local data;

translating the data update message to at least one global data operation configured to implement the update of the local data in global data, the global data including a plurality of hierarchical data structures, the translation being based at least in part on the life cycle status identifier; and applying the update to at least one of the plurality of hierarchical data structures by performing the at least one global data operation on the global data.

4. The system of claim 1, wherein the global data includes a plurality of hierarchical data structures, the life cycle coordinator being configured to asynchronously apply the update to the hierarchical data structures.

5. The system of claim 1, wherein the life cycle status identifier is representative of a life cycle stage for a data record associated with the update of the local data.

6. The system of claim 1, wherein the life cycle coordinator is further configured to use predefined global data operations logic to perform the translation.

7. The system of claim 1, wherein the life cycle coordinator is further configured to perform at least one global data operation to update the global data;

translate the at least one global data operation into at least one additional data update message; and provide the at least one additional data update message to at least one of the heterogeneous data subsystems, the at least one additional data update message being defined in accordance with the global data life cycle model and representing the update of the global data.

8. The system of claim 1, wherein the global data includes at least one subscriber record, at least one subscription record, and at least one map record, the at least one life cycle including a plurality of different life cycles associated with the at least one subscriber record, the at least one subscription record, and the at least one map record.

9. The system of claim 1, wherein the local life cycle includes a plurality of stages defining a life span of a global data record, the stages of the life span including statuses related to at least two of creation, modification, and deletion of the global data record, and the global data record includes a life cycle identifier indicative of the current life cycle status of the global data record.

10. The method of claim 2, further comprising using predefined global data operations logic to perform the translation.

11. The method of claim 2, further comprising:

performing at least one global data operation to update the global data;

translating the at least one global data operation into at least one additional data update message; and providing the at least one additional data update message to at least one of the heterogeneous data subsystems, the at least one additional data update message being defined in accordance with the global data life cycle model and representing the update of the global data.

12. The method of claim 2, wherein the global data includes at least one subscriber record, at least one subscription record, and at least one map record, the at least one life cycle including a plurality of different life cycles associated with the at least one subscriber record, the at least one subscription record, and the at least one map record.

13. The method of claim 2, wherein the global data includes a plurality of hierarchical data structures, and further comprising asynchronously applying the update of the local data to the hierarchical data structures based on the global data life cycle model.

14. The method of claim 3, further comprising asynchronously propagating at least one data update message to at least one other of the heterogeneous data subsystems, the at least one data update message being defined in accordance with the global data life cycle model and representing the update of the local data.

15. The method of claim 3, wherein the received data update message identifies one of the heterogeneous data subsystems as a source of the received data update message, and further comprising generating the global data operations to reflect the update of the local data performed in the source heterogeneous data subsystem.

16. The method of claim 3, further comprising scheduling to propagate the update of the local data to at least one of the plurality of hierarchical data structures at a later date.

17. The system of claim 7, wherein the at least one of the heterogeneous data subsystems is configured to translate the at least one additional data update message into at least one local data operation to be performed to implement the data update of the global data in the local data.

18. The system of claim 8, wherein the at least one map record includes a plurality of map records having different types, each map record type being associated with a different one of the life cycles.

19. The method of claim 11, wherein the at least one of the heterogeneous data subsystems is configured to translate the at least one additional data update message into at least one local data operation to be performed to implement the data update of the global data in the local data.

20. The method of claim 12, wherein the at least one map record includes a plurality of map records having different types, each map record type being associated with a different one of the life cycles.

21. The system of claim 17, wherein the at least one of the heterogeneous data subsystems is configured to use predefined local data operations logic to perform the translation, the predefined local data operations logic being representative of local business rules.

22. The system of claim 17, wherein the at least one of the heterogeneous data subsystems is configured to perform at least one local data operation to update the local data.

23. The method of claim 19, wherein the at least one of the heterogeneous data subsystems is configured to use predefined local data operations logic to perform the translation, the predefined local data operations logic being representative of local business rules.

24. The method of claim 23, further comprising performing at least one local data operation to update the local data.

* * * * *